(12) United States Patent
Dowell

(10) Patent No.: US 9,759,823 B1
(45) Date of Patent: Sep. 12, 2017

(54) DIRECTIONAL RADIATION DETECTORS

(71) Applicant: Los Alamos National Security, LLC, Los Alamos, NM (US)

(72) Inventor: L. Jonathan Dowell, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 14/328,535

(22) Filed: Jul. 10, 2014

Related U.S. Application Data

(63) Continuation of application No. 14/042,289, filed on Sep. 30, 2013, now abandoned.

(60) Provisional application No. 61/785,043, filed on Mar. 14, 2013.

(51) Int. Cl.
*G01T 1/202* (2006.01)
*G01T 1/29* (2006.01)
*G01T 3/06* (2006.01)
*G01V 5/00* (2006.01)

(52) U.S. Cl.
CPC .......... *G01T 1/2907* (2013.01); *G01T 1/202* (2013.01); *G01T 3/06* (2013.01); *G01V 5/0091* (2013.01)

(58) Field of Classification Search
CPC G01T 7/00; G01T 1/2907; G01T 3/00; G01T 1/167
USPC .................................................. 250/363.01
See application file for complete search history.

(56) References Cited

U.S. PATENT DOCUMENTS

| | | | | |
|---|---|---|---|---|
| 2,942,116 A * | 6/1960 | Axelrad | | 250/517.1 |
| 3,752,986 A * | 8/1973 | Fletcher et al. | | 250/394 |
| 3,951,550 A * | 4/1976 | Slick | | 356/141.5 |
| 4,172,226 A * | 10/1979 | Rubin | | 250/394 |
| 4,959,547 A * | 9/1990 | Carroll | | A61B 6/4258 250/336.1 |
| 5,081,362 A * | 1/1992 | Vargo | | G01T 7/00 250/472.1 |
| 5,286,973 A * | 2/1994 | Westrom et al. | | 250/253 |
| 5,557,107 A * | 9/1996 | Carcreff | | G01T 1/1648 250/361 R |
| 6,011,266 A * | 1/2000 | Bell | | 250/390.01 |
| 6,433,335 B1 * | 8/2002 | Kronenberg et al. | | 250/304 |
| 6,806,475 B1 * | 10/2004 | Lightfoot | | G01T 7/00 250/363.04 |
| 7,038,205 B2 * | 5/2006 | Bushberg | | A61B 6/4258 250/336.1 |
| 2001/0052572 A1* | 12/2001 | Mikami et al. | | 250/394 |
| 2011/0233419 A1* | 9/2011 | Norris | | 250/390.04 |
| 2012/0043471 A1* | 2/2012 | Harpring et al. | | 250/394 |

(Continued)

*Primary Examiner* — Marcus Taningco
(74) *Attorney, Agent, or Firm* — Klarquist Sparkman, LLP

(57) ABSTRACT

Directional radiation detectors and systems, methods, and computer-readable media for using directional radiation detectors to locate a radiation source are provided herein. A directional radiation detector includes a radiation sensor. A radiation attenuator partially surrounds the radiation sensor and defines an aperture through which incident radiation is received by the radiation sensor. The aperture is positioned such that when incident radiation is received directly through the aperture and by the radiation sensor, a source of the incident radiation is located within a solid angle defined by the aperture. The radiation sensor senses at least one of alpha particles, beta particles, gamma particles, or neutrons.

20 Claims, 14 Drawing Sheets

(56) References Cited

U.S. PATENT DOCUMENTS

2012/0091356 A1* 4/2012 Oh ................... G01T 1/2907
                                                  250/395
2012/0112099 A1* 5/2012 Coleman et al. .......... 250/473.1
2013/0206995 A1* 8/2013 Sur et al. ................. 250/370.1

* cited by examiner

DIRECTIONAL RADIATION DETECTORS

CROSS REFERENCE TO RELATED APPLICATIONS

This application claims the benefit of U.S. Non-Provisional application Ser. No. 14/042,289, filed Sep. 30, 2013 and titled "DIRECTIONAL RADIATION DETECTORS" and U.S. Provisional Application No. 61/785,043, filed Mar. 14, 2013 and titled "SYSTEM AND METHOD FOR DETECTING RADIOLOGICAL MATERIALS," both of which are incorporated herein by reference in their entirety.

ACKNOWLEDGMENT OF GOVERNMENT SUPPORT

This invention was made with government support under Contract No. DEAC52-06NA25396 awarded by the U.S. Department of Energy. The government has certain rights in the invention.

FIELD

This disclosure relates generally to the field of detection and security, and more particularly to the sensing, detection, and monitoring of radioactive materials, including, for example, special nuclear materials.

BACKGROUND

An adverse consequence of the nuclear age is the potential proliferation and distribution of materials that can be hazardous or even catastrophic in their misuse. The United States Nuclear Regulatory Commission classifies special nuclear material into three broad categories based upon potential threat. Category 1 includes strategic special nuclear material; category 2 includes special nuclear material of moderate strategic significance; and category 3 includes special nuclear material of low strategic significance. Each of the three categories of special nuclear material can be configured into a potential threat, ranging from a thermonuclear or atomic warhead to a clandestine nuclear weapon to a so-called dirty bomb.

Unfortunately, special nuclear material can become a significant risk in quantities on the order of kilograms. The ease of portability of such potentially devastating materials makes detection and monitoring of special nuclear material of paramount concern to citizens and governments worldwide. Conventional radiation detectors can be used to locate radioactive materials, but conventional radiation detectors typically detect the mere presence of a radioactive source. Accordingly, there is a need for an improved system for detecting special nuclear material that is readily deployable, easy to distribute, and highly accurate and reliable.

SUMMARY

Examples described herein relate to directional radiation detectors and detection of radioactive sources using directional radiation detectors. A directional radiation detector can include a radiation sensor. A radiation attenuator can partially surround the radiation sensor. The radiation attenuator can define an aperture through which incident radiation is received by the radiation sensor. The aperture can be positioned such that when incident radiation is received directly through the aperture and by the radiation sensor, a source of the incident radiation is located within a solid angle defined by the aperture. The radiation sensor can sense alpha particles, beta particles, or other charged particles; gamma particles; and/or neutrons.

Directional radiation detectors can scan a volume to accurately determine the location of a radioactive source within the volume. Detector data can be received from one or more directional radiation detectors. The detector data can include readings of radiation magnitude and a corresponding detector aperture orientation for each of the directional radiation detectors. For each detector, it can be determined, based on the received detector data, that a radiation magnitude represents radiation emitted by the radioactive source and received through the aperture. A detector aperture orientation corresponding to the radiation magnitude can be identified and used to calculate a solid angle within which the radioactive source is located. The location of the radioactive source can be determined based on an intersection of the solid angles calculated for the multiple directional radiation detectors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

DETAILED DESCRIPTION

Directional radiation detectors can be made by shielding a portion of a radiation sensor with an attenuating radiation shield and leaving a portion unshielded. For a given stream of particles from a radiation source, if the radiation were received through the unshielded portion, the radiation sensor would indicate a greater radiation magnitude than if the radiation were received through the attenuating radiation shield. The directional radiation detector can take multiple readings at different orientations, and the difference in radiation magnitudes of these readings can be used to identify the location of the radiation source. Examples are described in detail below with reference to FIGS. 1A-14.

Figure 1B:
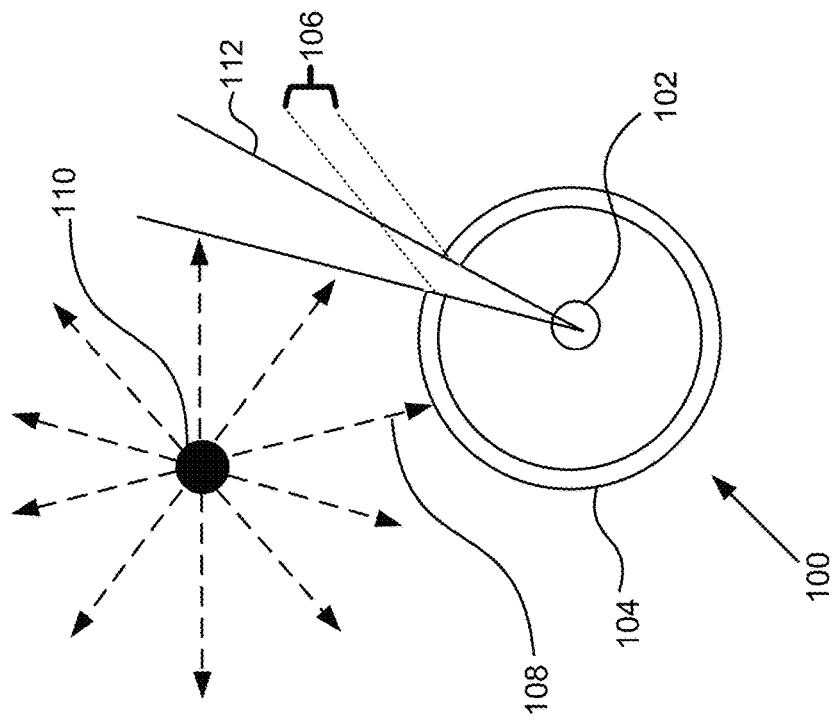
FIG. 1B is a simplified cross-sectional view of an example directional radiation detector in which incident radiation strikes an attenuator.
Figure 1A:
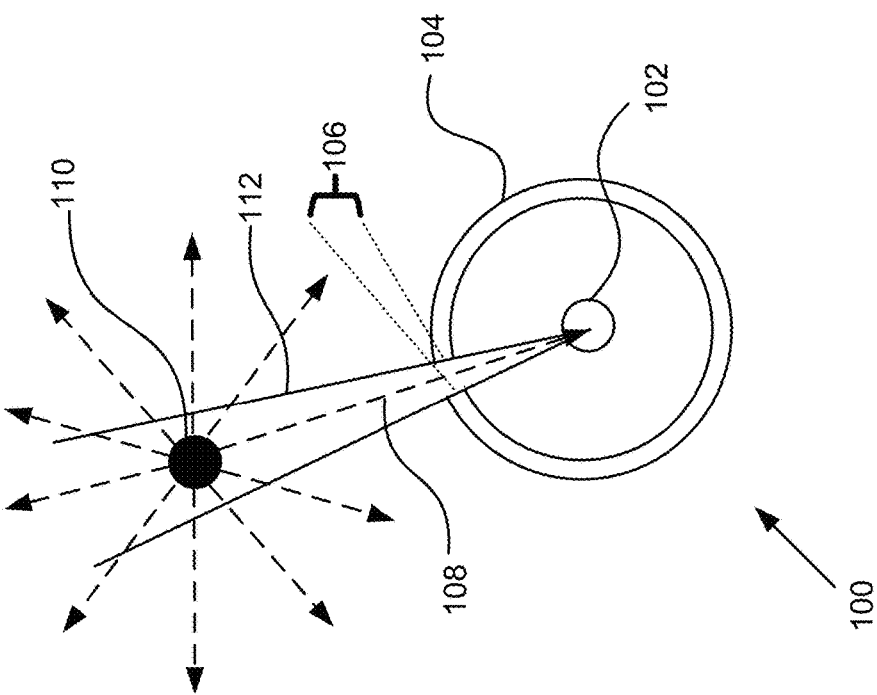
FIG. 1A is a simplified cross-sectional view of an example directional radiation detector receiving incident radiation through an aperture.

FIG. 1A illustrates a simplified cross-sectional view of a directional radiation detector 100. Directional radiation detector 100 includes a radiation sensor 102 and a radiation attenuator 104. Radiation sensor 102 can sense one or more of alpha particles, beta particles, gamma particles, or neutrons. Radiation attenuator 104 partially surrounds radiation sensor 102 and defines an aperture 106 through which incident radiation 108 is received by radiation sensor 102. Aperture 106 is positioned relative to sensor 102 such that when incident radiation 108 is received directly through aperture 106 and by radiation sensor 102, a source 110 of incident radiation 108 is located within a solid angle 112 defined by aperture 106. Throughout this document, the terms "radiation attenuator," "attenuator," and "attenuating radiation shield" are used interchangeably.

As used in this document, an "aperture" is an opening of any size or shape. Depending on the configuration of directional radiation detector 100, aperture 106 can take a variety of forms including but not limited to: a circular opening, rectangular opening, slit, or an irregular opening. Aperture 106 can be defined in two or three dimensions. In some examples, aperture 106 can be larger than radiation attenuator 104. In such examples, the solid angle defined by aperture 106 can be greater than $2\pi$ steradians. Aperture 106 can be adjustable. Adjusting the size of aperture 106 changes the size of solid angle 112. For example, widening aperture 106 causes solid angle 112 to widen accordingly, and narrowing aperture 106 causes solid angle 112 to narrow accordingly. The size of solid angle 112 can also be modified by adjusting a distance 114 between radiation sensor 102 and aperture 106. For example, moving radiation sensor 102 closer to aperture 106 widens solid angle 112.

FIG. 1B illustrates directional radiation detector 100 oriented with aperture 106 pointing away from radiation source 110. In this orientation, incident radiation 108 strikes radiation attenuator 104 rather than being directly received by radiation sensor 102. Radiation attenuator 104 acts to reflect and/or absorb incident radiation 108. With the orientation shown in FIG. 1B, radiation sensor 102 indicates a received radiation magnitude that is less than a received magnitude indicated with the orientation shown in FIG. 1A. In some examples, radiation attenuator 104 attenuates all or substantially all of incident radiation 108 that strikes radiation attenuator 104. Directional radiation detector 100 can be a gamma and/or neutron radiation detector. Radiation attenuator 104 can comprise a high-density material such as tungsten or lead that absorbs gamma particles. Radiation attenuator 104 can also comprise one or more materials that slow and/or absorb neutrons, as discussed below in more detail with reference to FIG. 2.

Figure 10:
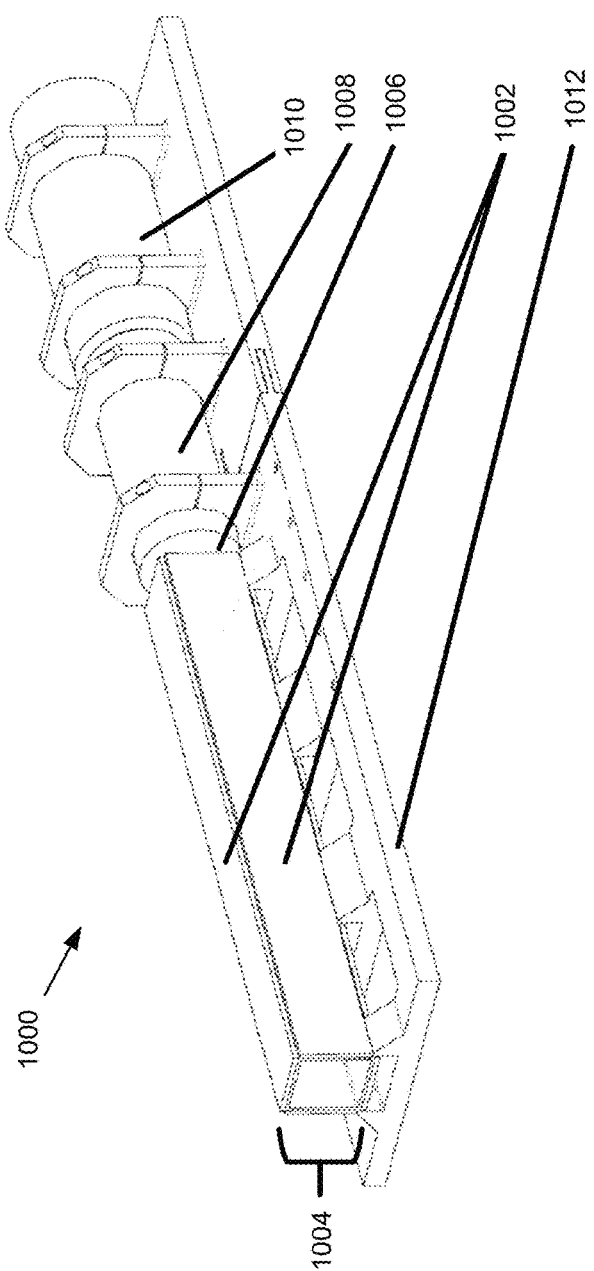
FIG. 10 is a perspective view of an example directional radiation detector capable of detecting gamma particles.
Figure 12:
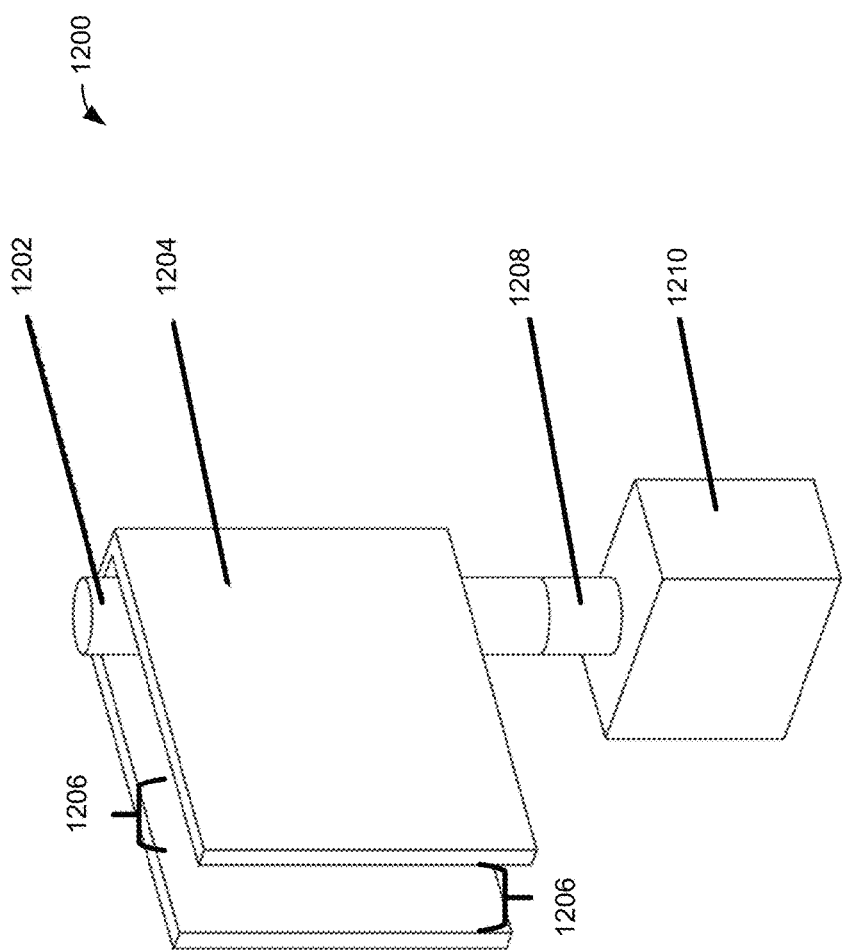
FIG. 12 is a perspective view of an example directional radiation detector capable of detecting neutrons.

In FIGS. 1A and 1B, the cross-section of directional radiation detector 100 is circular, indicating that directional radiation detector 100 is cylindrical or spherical. Similarly, radiation sensor 102 is simplistically represented as circular or spherical. Attenuator 104 is shown as nearly completely surrounding radiation sensor 102. A variety of other geometries for directional radiation detector 100, radiation sensor 102, attenuator 104, and aperture 106 are possible. Example geometries are illustrated in FIGS. 10 and 12.

Figure 2:
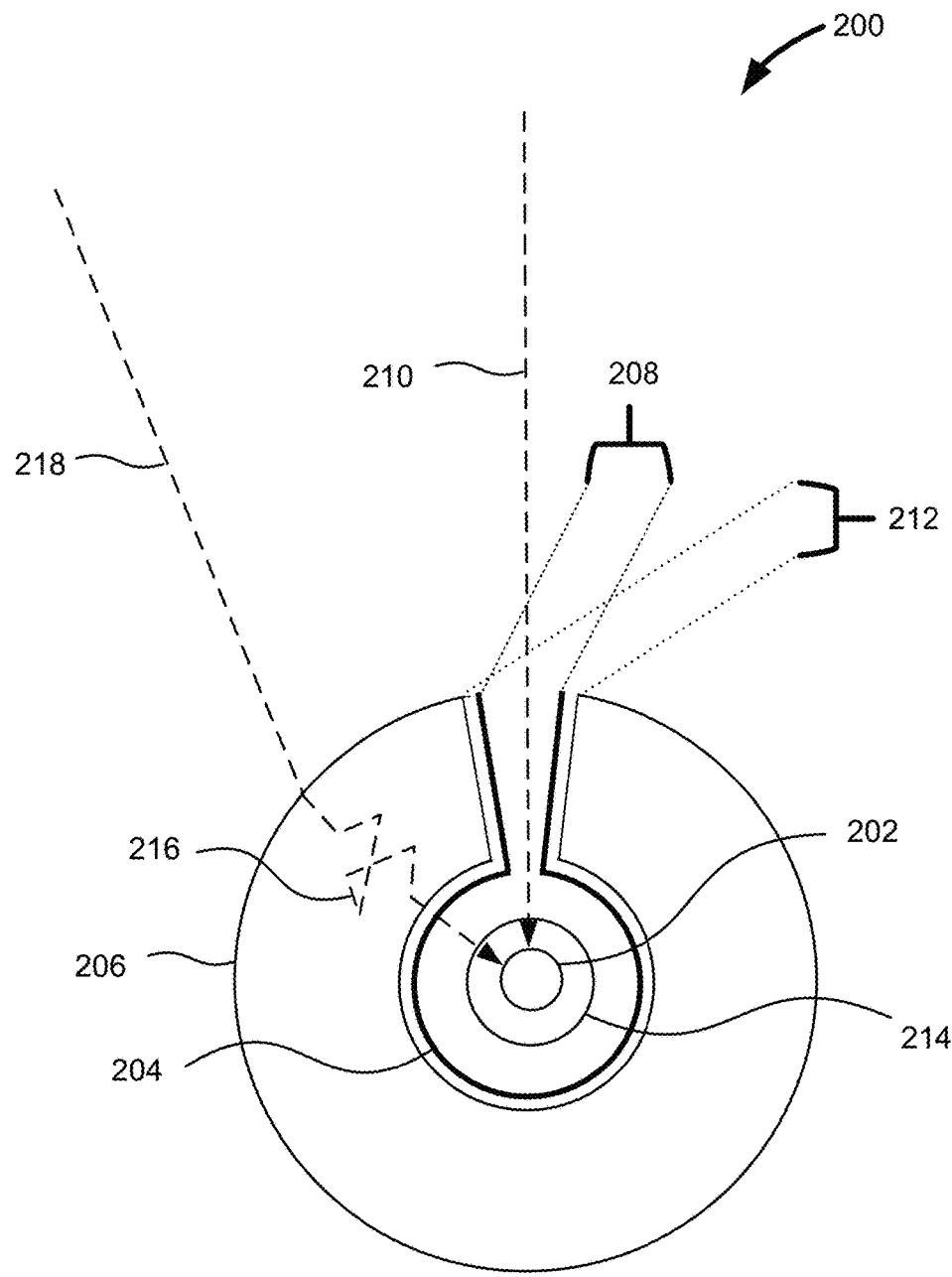
FIG. 2 is a simplified cross-sectional view of an example directional radiation detector having two attenuators.

FIG. 2 illustrates directional radiation detector 200. Directional radiation detector 200 includes a radiation sensor 202, a first radiation attenuator 204, and a second radiation attenuator 206. First radiation attenuator 204 partially surrounds radiation sensor 202 and defines a first aperture 208 through which incident radiation 210 is received by radiation sensor 202. Second radiation attenuator 206 partially surrounds both radiation sensor 202 and first radiation attenuator 204 and defines a second aperture 212 through which incident radiation 210 is received by radiation sensor 202.

In FIG. 2, first aperture 208 and second aperture 212 are substantially aligned such that incident radiation 210 can strike radiation sensor 202 directly when a source is located within a solid angle defined by first aperture 208 and second aperture 212. In some examples, radiation sensor 202 senses gamma particles and neutrons. In examples where first radiation attenuator 204 attenuates gamma particles, and second radiation attenuator 206 attenuates neutrons, a source of both gamma particles and neutrons can be detected via the substantially aligned first aperture 208 and second aperture 212. In FIG. 2, an additional attenuator 214 surrounds radiation sensor 202 to slow fast neutrons that travel directly through first aperture 208 and second aperture 212. In some examples, first aperture 208 and second aperture 212 are only partially aligned. In other examples, first aperture 208 and second aperture 212 do not overlap.

In some examples, directional radiation detector 200 is a neutron detector. In such examples, second radiation attenuator 206 slows neutrons, and first radiation attenuator 204 absorbs neutrons. Neutrons can be difficult to detect due to the electrical neutrality of neutrons and the neutron transparency of many materials. So-called fast neutrons (those neutrons emitted by radioactive isotopes and having kinetic energies greater than or equal to approximately 1 MeV) pass through most materials with negligible interactions. High-density materials made of low-atomic-number atoms can "thermalize" these fast neutrons. Atoms of low atomic number have small electron clouds, resulting in nuclei of atoms in these materials being close together. Fast neutrons can bounce off of these nuclei, losing energy through multiple ricochets, as illustrated by ricochet path 216 of second incident radiation 218 in FIG. 2. Second incident radiation 218 is received at sensor 202 through first radiation attenuator 204, second radiation attenuator 206, and additional attenuator 214. Second radiation attenuator 206 and additional attenuator 214 can, for example, comprise water or polyethylene to slow or thermalize fast neutrons. Other materials that can thermalize neutrons include isotopes, mixtures, metals, or alloys and compounds of rare-earth elements such as samarium and gadolinium.

After the neutrons lose enough energy, slowing to around 0.025 eV to become so-called thermal neutrons, the absorption cross section of other materials can become high enough to trap these thermal neutrons. First radiation attenuator 204 can include neutron absorbing materials such as boron carbide or cadmium (e.g., cadmium containing the isotope cadmium-113). Other materials that can either thermalize and/or absorb neutrons include boron, xenon, hafnium, dysprosium, erbium, europium, molybdenum, ytterbium, and their compounds and most hydrocarbons.

Figure 3:
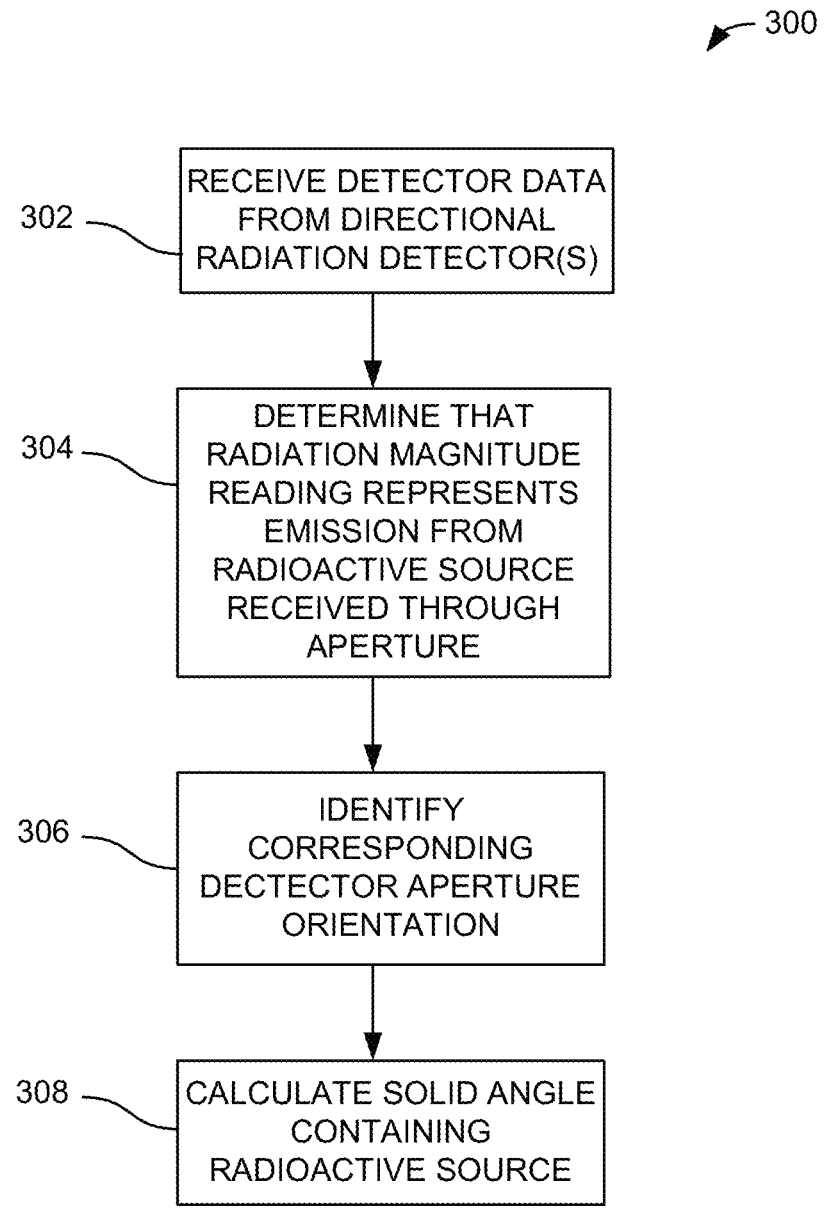
FIG. 3 is a flowchart of an example method for determining the location of a radioactive source.

FIG. 3 illustrates an example method 300 of determining the location of a radioactive source. Method 300 can be performed, for example, using directional radiation detectors such as detectors 100 and 200. In process block 302, detector data is received from one or more directional radiation detectors that each has an attenuating radiation shield partially surrounding a radiation sensor. The attenuating radiation shield defines an aperture through which incident radiation is received by the radiation sensor. The detector data comprises, for each of the one or more directional radiation detectors, a plurality of readings of a radiation magnitude and a corresponding detector aperture orientation. Process blocks 304, 306, and 308 can be performed for each of the one or more directional radiation detectors. In process block 304, it is determined, based on the received detector data, that a radiation magnitude represents radiation both emitted by the radioactive source and received through the aperture. The corresponding detector aperture orientation is identified in process block 306. In process block 308, a solid angle within which the radioactive source is located is calculated based on the detector aperture orientation.

The plurality of readings of radiation magnitude and corresponding detector aperture orientation received in process block 302 can be gathered by scanning a volume with one or more directional radiation detectors. Scanning can comprise rotating the one or more directional radiation detectors such that for each rotated detector, a solid angle determined by the detector aperture sweeps across a portion of the volume. Scanning can also comprise varying the size or orientation of the detector aperture of the one or more directional radiation detectors.

Figure 4:
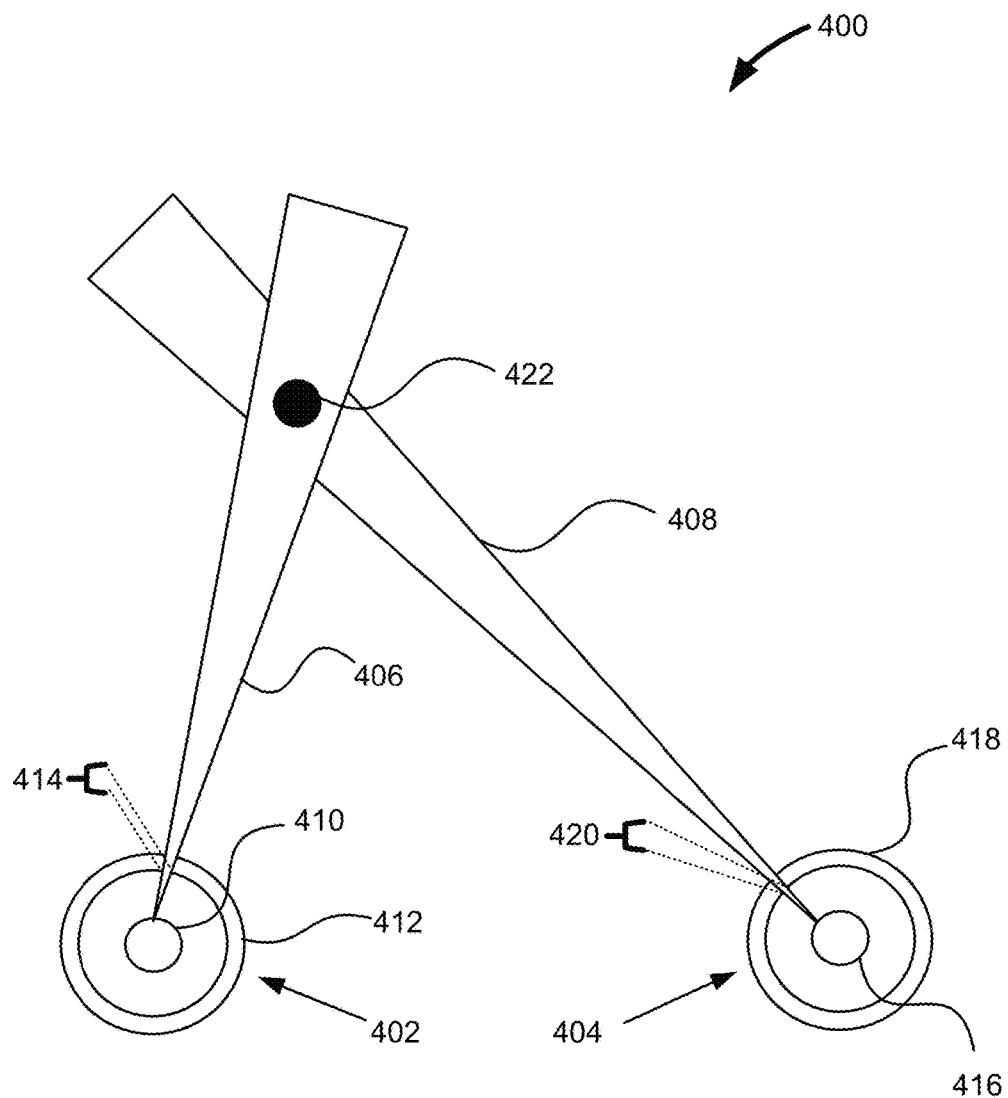
FIG. 4 is a system diagram illustrating an example radioactive source detection system having two directional radiation detectors.

FIG. 4 illustrates a radioactive source detection system 400 in which two detectors 402 and 404 scan a volume by rotating to sweep solid angles 406 and 408 across a volume. Detector 402 includes a radiation sensor 410, a radiation attenuator 412, and an aperture 414. Detector 404 includes a radiation sensor 416, a radiation attenuator 418, and an aperture 420. Detectors 402 and 404 can rotate synchronously or independently. During a scan, when a radioactive source 422 is located within solid angle 406 or solid angle 408, the corresponding radiation sensor will receive incident radiation emitted by radioactive source 422 directly (unattenuated). When the orientation of detectors 402 and 404 is different, however, and radioactive source 422 is not within solid angles 406 or 408, the corresponding radiation sensor will receive either no incident radiation emitted by radioactive source 422 or attenuated radiation.

The results of a scan can thus be analyzed to identify the location of radioactive source 422. For example, in a scan performed using detector 402, the scan can begin with aperture 414 facing horizontal and left, and radiation magnitude and aperture orientation can be determined incrementally until aperture 414 faces horizontal and right. A measurement can be made, for example, every x degrees of orientation change or every y time increment. Analysis of the measurements will identify many radiation magnitude measurements that are low, representing attenuated incident radiation received through attenuator 412, and a smaller number of radiation magnitude measurements that are higher, representing incident radiation received directly or indirectly (e.g. through reflection) through aperture 414. After the measurements that are high relative to the other measurements are identified, the corresponding detector aperture orientation can be identified. It can then be determined that radioactive source 422 is within the solid angle defined by aperture 414 when aperture 414 has the identified orientation. A similar scan and source location process can be performed using detector 404. Ascertaining the location of a source using multiple detectors, or multiple scans with the same detector in different locations, can provide a more accurate location, and in situations with multiple radioactive sources, help eliminate false positives.

Although FIG. 4 illustrates scanning in two dimensions, in some examples, detectors 402 and 404 scan one or more times along multiple axes and have multiple degrees of freedom. In other examples, apertures 414 and 420 are configured such that solid angles 406 and 408 have a desired height or width and scan along only one axis. In still other examples, a detector can scan a full 360 degrees about an arbitrary axis.

Detectors 402 and 404 can be configured in other ways and still operate to provide "relative" or "differential" detection of radiation magnitude. For example, rather than an aperture in attenuators 412 and 418, attenuators 412 and 418 can substantially surround radiation sensors 402 and 404 but be thinner over a certain location to create an effective "aperture" such that sensor 410 and 416 will indicate a distinguishable difference in radiation magnitude when the thin area is oriented toward source 422 and when it is oriented away from source 422. In other examples, the attenuator material can be different to create an "aperture," for example using a tungsten mesh rather than solid tungsten.

Figure 5:
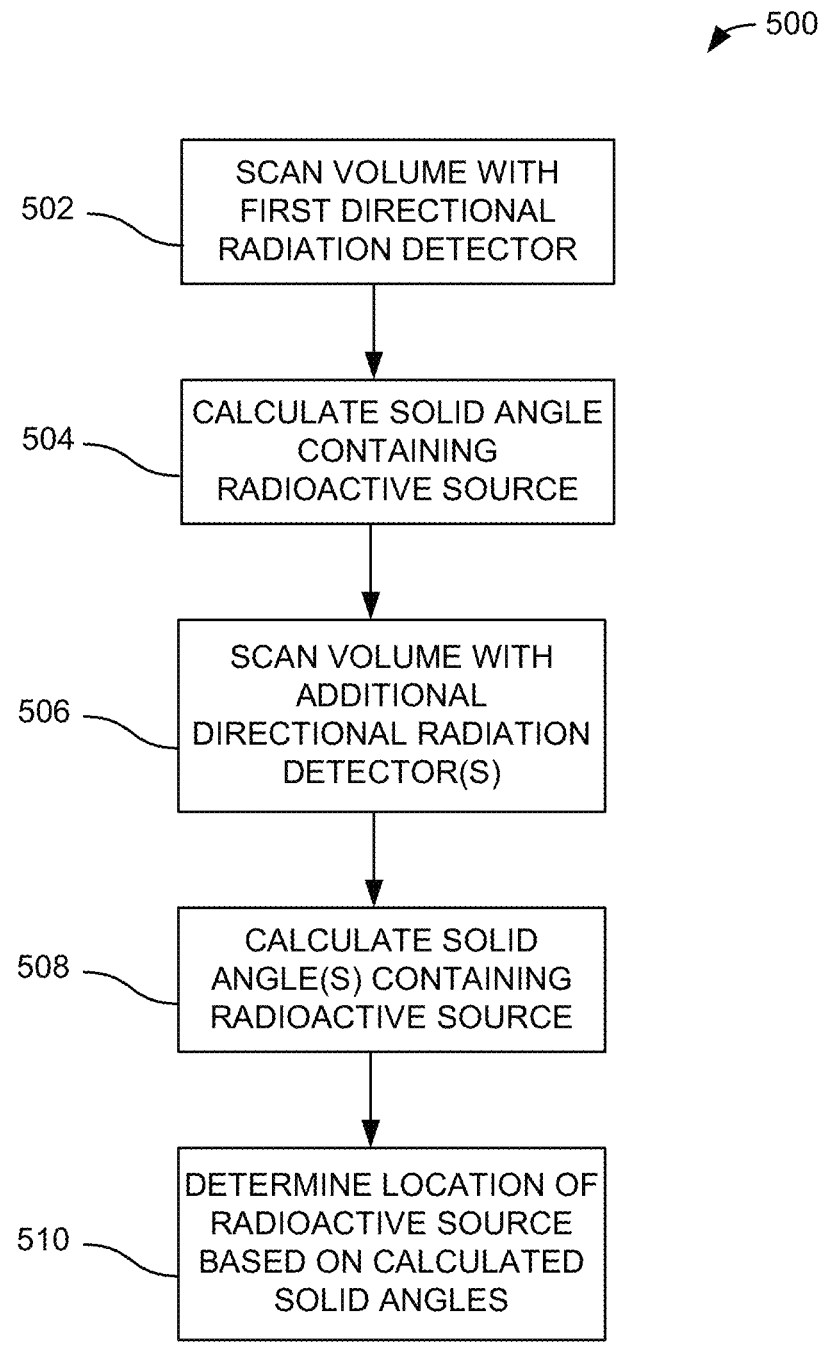
FIG. 5 is a flowchart of an example method for determining the location of a radioactive source in which a volume is scanned with multiple directional radiation detectors.

FIG. 5 illustrates a method 500 in which scans are conducted with multiple detectors. In process block 502, a volume is scanned with a first directional radiation detector. In process block 504, a solid angle within which a radioactive source is located is calculated. In process block 506, the volume is scanned using one or more additional directional radiation detectors. Solid angles within which the radioactive source is located are calculated for the one or more additional detectors in process block 508. In process block 510, a location of the radioactive source is determined based on the solid angles calculated as a result of the scan conducted by the first detector and the one or more additional detectors. For example, a location can be accurately determined as the intersection of multiple calculated solid angles.

Figure 6:
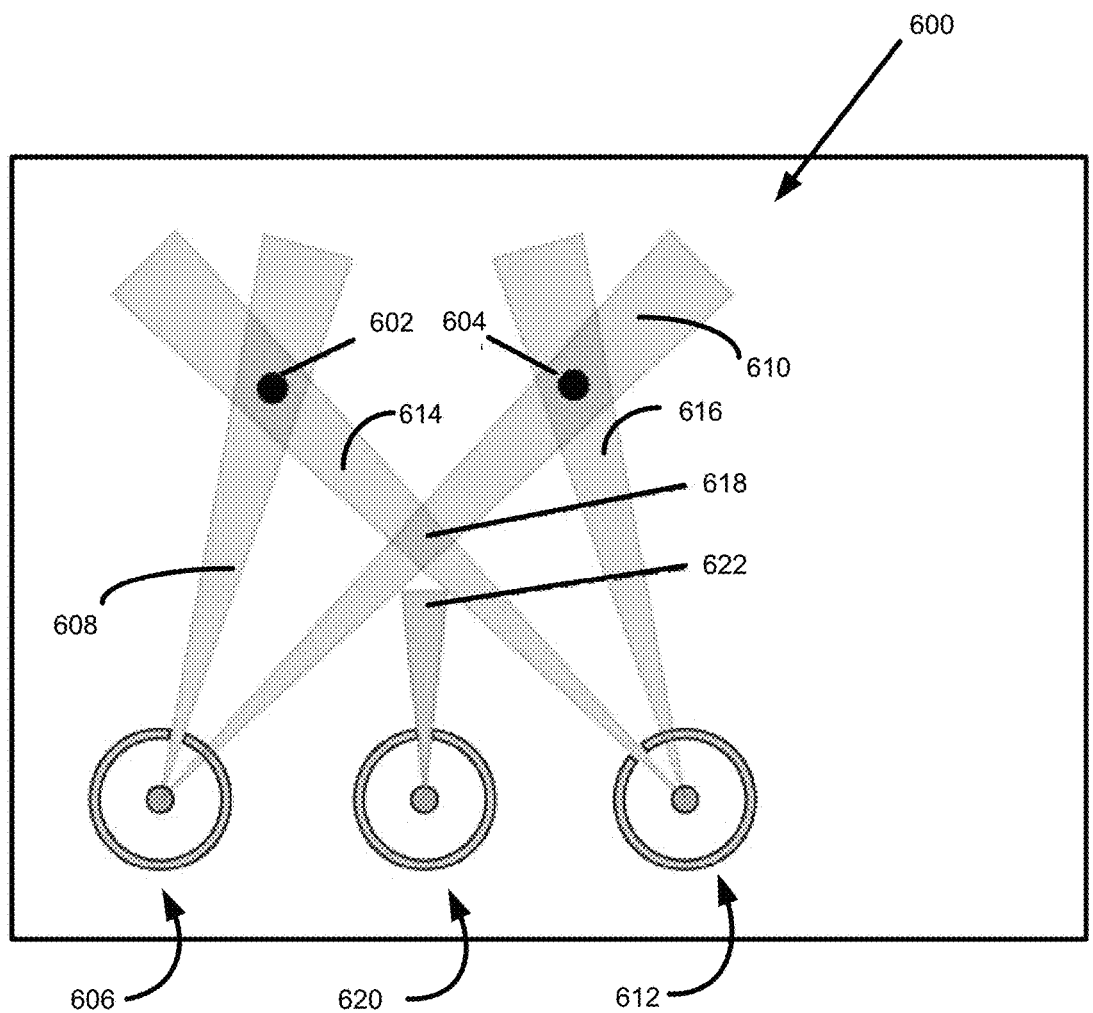
FIG. 6 is a system diagram illustrating an example radioactive source detection system having three directional radiation detectors.

FIG. 6 illustrates a radioactive source detection system 600 in which two radioactive sources 602 and 604 are present. A scan using only radiation detector 606 will identify solid angles 608 and 610 in which sources 602 and 604 are located. Detector 612 will similarly identify solid angles 614 and 616 in which sources 602 and 604 are located. As discussed above, an intersection of multiple solid angles in which it is determined a source is located can more accurately identify the location of the source. Rather than identifying that a source is simply anywhere within the solid angle, having two solid angles allows the location to be refined to the intersection of multiple solid angles. If only detectors 606 and 612 are used, however, intersection 618 will result in a false positive. A scan conducted by a third detector 620 will not indicate a source within solid angle 622 and can eliminate the false positive caused by intersection 618. Three detectors can also more accurately determine location in three dimensions.

Figure 7A:
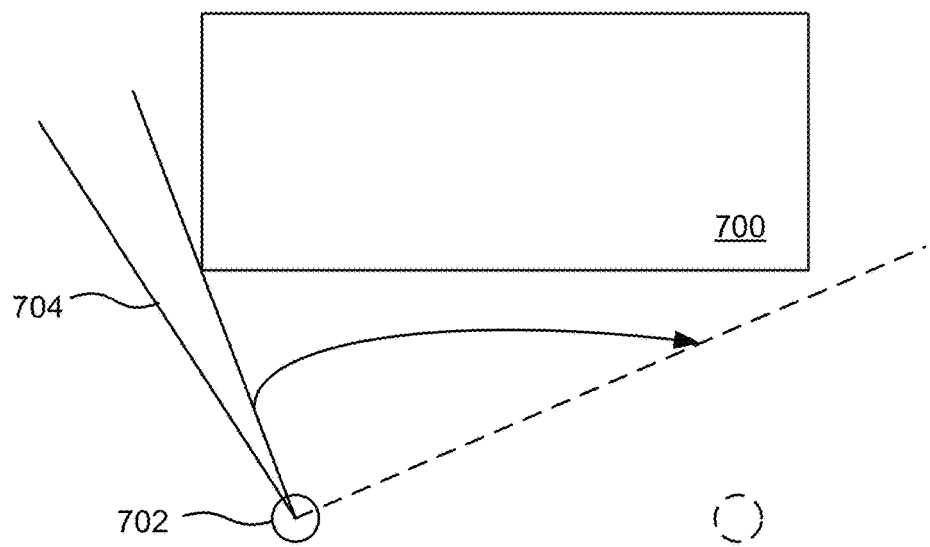
FIGS. 7A and 7B illustrate operation an example radioactive source detection system in which multiple scans of a volume can be conducted with one directional radiation detector.
Figure 7B:
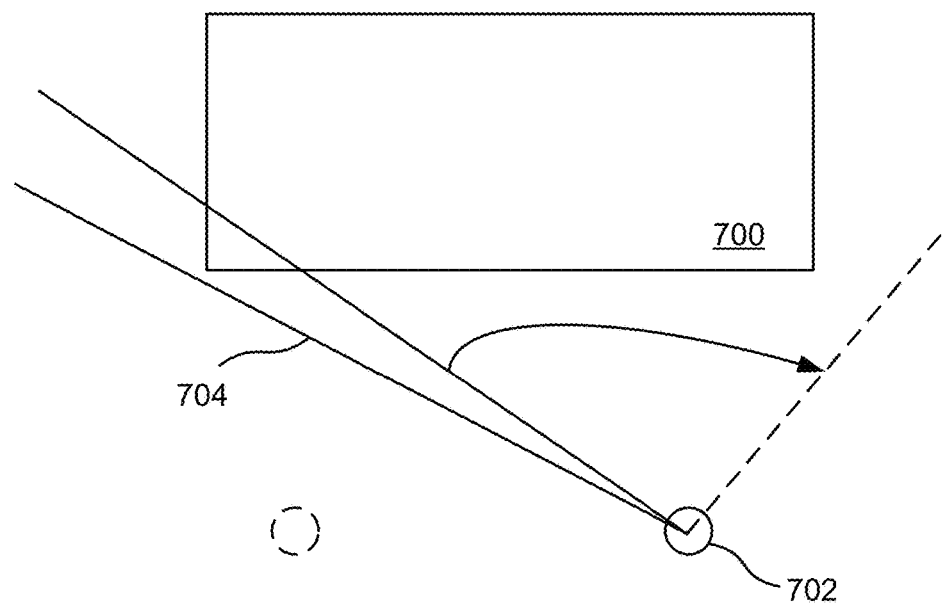

FIGS. 7A and 7B illustrate a scan of a volume 700 conducted using a single detector 702. In some contexts, such as inspection of a small compartment or inventory of a warehouse or nuclear facility, where the party performing a scan is in control of the environment, a single detector can be used to perform multiple scans from different locations to achieve the accuracy benefits of multiple detectors. In FIG. 7A, volume 700 is scanned with detector 702 on the left. Solid angle 704 is defined by an aperture in detector 702. In FIG. 7B, volume 700 is scanned with detector 702 on the right. Additional scans can also be conducted and used to estimate location in two or three dimensions.

Figure 8:
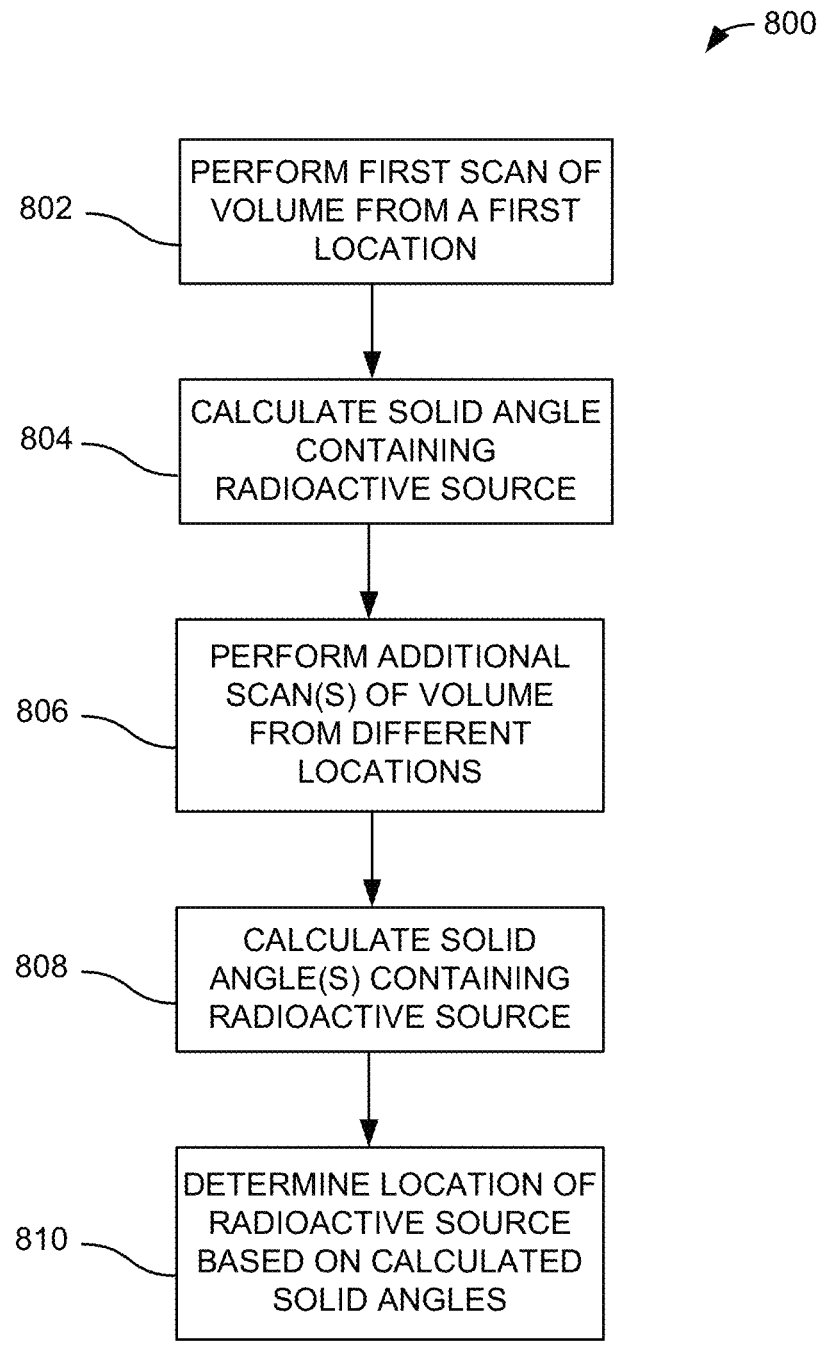
FIG. 8 is a flowchart of an example method for performing multiple scans of a volume with one or more directional radiation detectors.

FIG. 8 shows a method 800 for scanning a volume using a single directional radiation detector. In process block 802, a first scan of a volume is conducted from a first location. In process block 804, a solid angle containing a radioactive source is calculated based on detector data obtained from the first scan. In process block 806, one or more additional scans of the volume are performed from different locations. In process block 808, solid angles containing the radioactive source are calculated based on detector data obtained from the one or more additional scans. In process block 810, the location of the source can be determined as the intersection of the solid angles calculated as a result of each scan.

Figure 9:
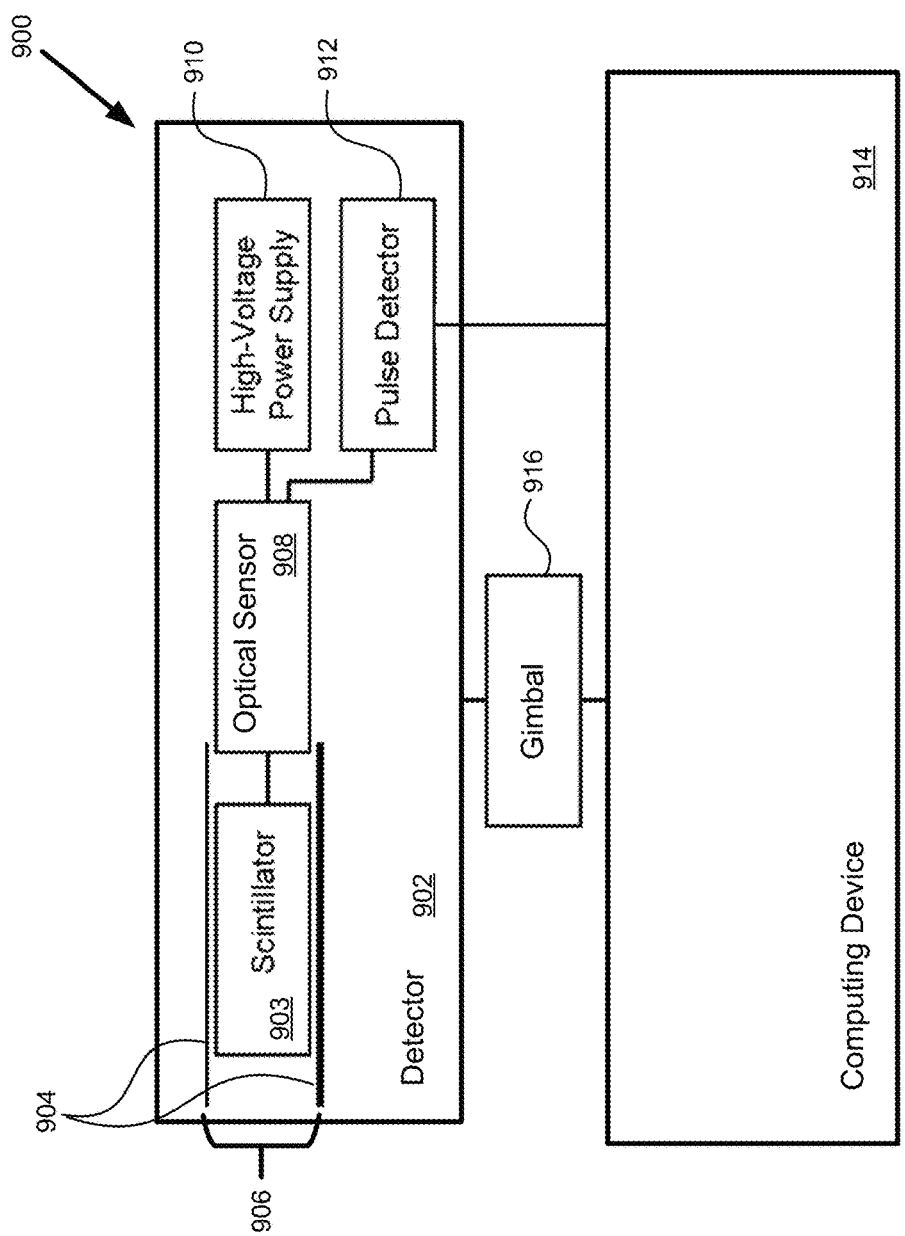
FIG. 9 is a block diagram illustrating an example radioactive source detection system capable of detecting gamma particles.

FIG. 9 is a block diagram of a radioactive source detection system 900 capable of detecting gamma particles. Directional radiation detector 902 detects gamma particles. Detector 902 includes a scintillator 903 that serves as a gamma radiation sensor. Gamma radiation includes high energy photons, which interact with matter through various phenomena such as fluorescence excitation, photoelectric excitation, Compton scattering, and nuclear electron-positron pair production. A scintillator exhibits luminescence when excited by ionizing radiation by absorbing the radiation and re-emitting the energy as light. Examples of scintillators include crystals such as sodium iodide, lithium, ytterbium, and/or garnet crystals. Some scintillators, such as CLYC ($Cs_2LiYCl_6$:Ce) crystals, emit light of different pulse shapes based on the type of received radiation and thus can be used to sense and distinguish gamma radiation and neutrons using pulse shape discrimination (PSD). Additionally, different levels of gamma radiation can be distinguished between using scintillators having different output pulses.

Scintillator 903 is partially surrounded by attenuator 904, which can be made, for example, of lead or tungsten. Attenuator 904 defines an aperture 906 through which incident radiation can be received by scintillator 903. In FIG. 9, attenuator 904 does not surround the rear of scintillator 903. Such a configuration can be used in situations in which a source being searched for is expected in a location where incident radiation will not be received from the rear. For example, the rear of the sensor could be left open and not surrounded by attenuator 904 if detector 902 were scanning a room or warehouse from the entryway to the room or warehouse and looking for a source potentially stored somewhere against a far wall.

Scintillator 903 is connected to optical sensor 908, which can be, for example, a photomultiplier, an avalanche photodiode, a cascaded microchannel plate or other optical sensor. Optical sensor 908 receives output light pulses from scintillator 903 and creates electrical signals such as current or voltage pulses. High-voltage power supply 910 powers optical sensor 908. Pulse detector 912 detects electrical output pulses produced by optical sensor 908 and communicates the pulses to computing device 914. In some examples detector 902 is connected to a movable structure such as gimbal 916. Gimbal 916 allows detector 902 to be oriented with a number of degrees of freedom. Gimbal 916 can be manually controlled or can be automatically controlled via computing device 914. In some examples, detector 902 is fixedly mounted, and aperture 906 is movable. Computing device 914 can analyze received detector data to locate a radioactive source. In some examples, pulse detector 912 also permits PSD.

FIG. 10 is a partial perspective view of a directional radiation detector 1000 similar to detector 902 illustrated in FIG. 9. In detector 1000, a radiation attenuator 1002 partially surrounds a scintillator crystal (inside attenuator 1002). Attenuator 1002 defines an aperture 1004 through which incident radiation can be directly received by the scintillator crystal. A scintillator crystal holder 1006 keeps the scintillator crystal in place. A photomultiplier tube 1008 (or other optical sensor) receives optical output from the scintillator crystal. Power supply and pulse detector unit 1010 supplies power to photomultiplier tube 1008 and detects electrical pulses output from photomultiplier tube 1008. Detector 1000 is mounted to a chassis 1012, which can be connected to a gimbal, tripod, or other rotatable mechanism.

Figure 11:
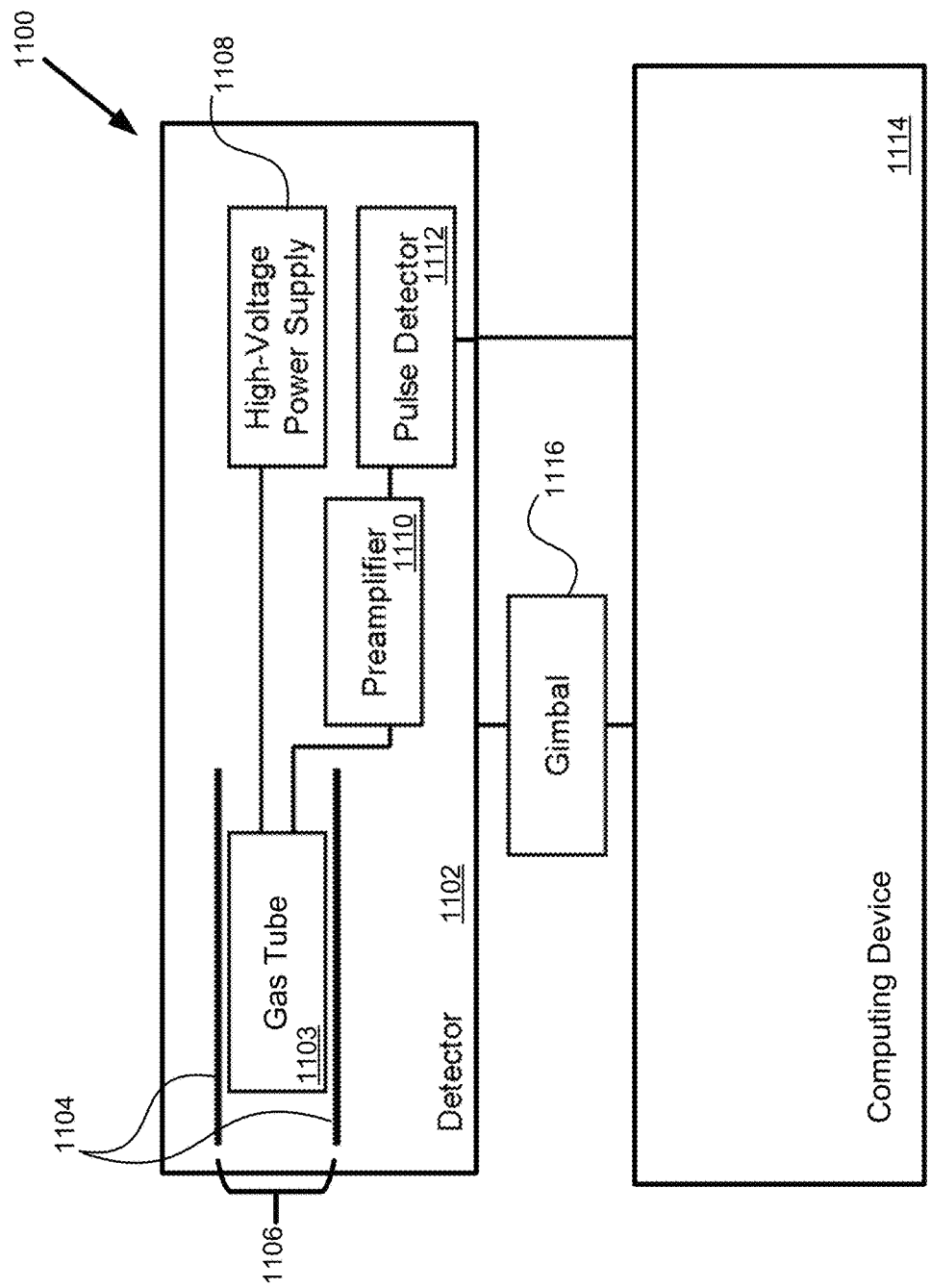
FIG. 11 is a block diagram illustrating an example radioactive source detection system capable of detecting neutrons.

FIG. 11 is a block diagram of a radioactive source detection system 1100. Directional radiation detector 1102 detects neutrons. Detector 1102 includes a gas tube 1103 that serves as a neutron sensor. In some examples, a helium-3 gas tube is used. Lithium-6, boron-10, and uranium-235 can also be used. Other neutron sensors such as luminescent ceramics containing gadolinium, europium, or other rare-earth phosphors and luminescent materials containing Lithium-6 can also be used.

Gas tube 1103 can also be lined with a moderator material such as boron. Gas tube 1103 is partially surrounded by attenuator 1104, which can be made, for example, of boron carbide. In other examples, a dual layer attenuator is used, for example water or polyethylene to slow neutrons and boron carbide or a heavy metal to absorb neutrons. Attenuator 1104 defines an aperture 1106 through which incident radiation can be received by gas tube 1103. In some examples, gas tube 1103 is surrounded by an additional attenuator to slow neutrons, such as water or polyethylene, such that when incident neutrons are received directly through aperture 1106, the neutrons can be slowed by the additional attenuator prior to reaching gas tube 1103.

Gas tube 1103 is supplied by high-voltage power supply 1108. Gas tube 1103 absorbs thermal neutrons and ionizes the gas within the tube to create an electrical signal. An electrical output from gas tube 1103 is amplified by preamplifier 1110 and provided to pulse detector 1112. Pulse detector 1112 detects the electrical output pulses produced by preamplifier 1110 and communicates the pulses to computing device 1114. In some examples, output pulses generated by gas tube 1103 are sufficiently large and/or pulse detector 1112 is sufficiently sensitive that preamplifier 1110 is not used. In some examples detector 1102 is connected to a movable structure such as gimbal 1116. In some examples detector 1102 is fixedly mounted, and aperture 1106 is movable. Computing device 1114 can analyze received detector data to locate a radioactive source. Computing device 1114 can also provide source locations for more than one type of particle passed on PSD applied to pulses from the pulse detector 1112.

FIG. 12 is a partial perspective view of a directional radiation detector 1200 similar to detector 1102 illustrated in FIG. 11. In detector 1200, a gas tube 1202 is partially surrounded by a radiation attenuator 1204. Attenuator 1204 defines an aperture 1206 through which incident radiation can be received by gas tube 1202. Gas tube 1202 outputs an electrical pulse to preamplifier and pulse detector unit 1208. Detector 1200 can be mounted on a movable structure such as a gimbal 1210.

Figure 13:
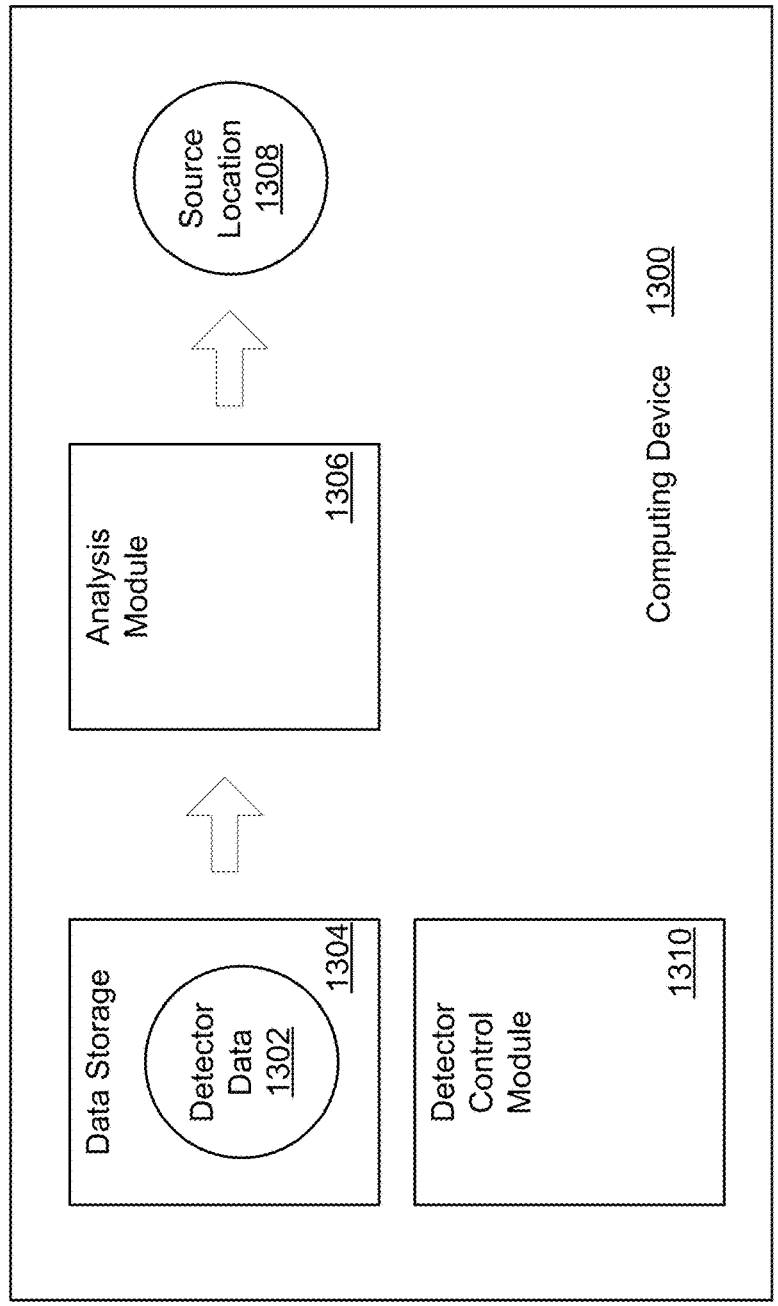
FIG. 13 is a block diagram illustrating an example computing device capable of determining the location of a radioactive source.

FIG. 13 illustrates an example computing device 1300. Computing device 1300 can be used, for example as computing device 914 in FIG. 9 or computing device 1114 in FIG. 11. Detector data 1302 is received by computing device 1300 and can be stored in data storage 1304. Detector data 1302 can include, for each of the one or more directional radiation detectors, a plurality of readings of a radiation magnitude, pulse shapes, and a corresponding detector aperture orientation. Analysis module 1306 controls the identification of the location and type of a radioactive source based on detector data 1302. For example, analysis module 1306 determines, based on received detector data 1302, that a radiation magnitude represents radiation emitted by a radioactive source and received through an aperture defined by a radiation attenuator of the detector. Analysis module 1306 also identifies the corresponding detector aperture orientation, and based on the detector aperture orientation, calculates a solid angle within which the radioactive source is located.

Analysis module 1306 can perform calculations that include assumptions about the geometry of the radiation source (e.g., assuming the source is a point, having $1/r^2$ dependence of radiation magnitude vs. distance; or a long cylinder, having $1/r$ dependence of magnitude vs. distance) and isotropy of the radiation from the source.

The directional radiation detectors described herein are described with reference to gamma particle and neutron detection. Directional radiation detectors can also be used for detecting alpha and beta radiation, however alpha and beta detectors are more accurate over short ranges (e.g. 10 or 20 feet), because electromagnetic fields can deflect the paths of alpha and beta radiation.

The directional radiation detectors described herein can also be used to form a cosmic gamma ray telescope. For example, a narrow aperture (e.g. pin hole) could be defined by an attenuator partially surrounding a gamma ray sensor. Individual detectors or an array of such detectors could be used to scan the sky to identify the location of sources of gamma radiation.

Example Computing Environments

Figure 14:
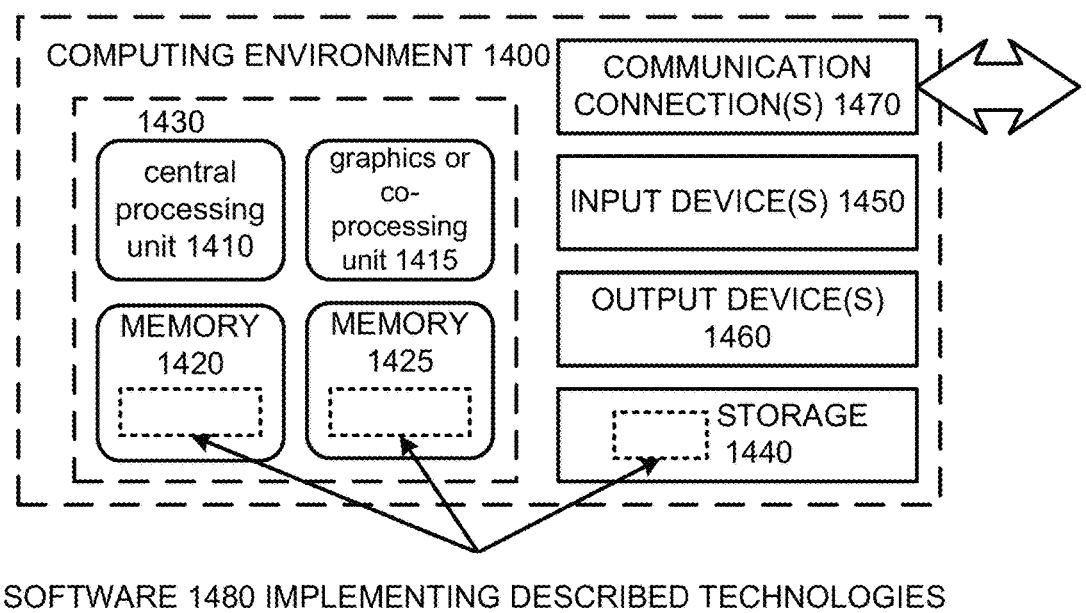
FIG. 14 is a block diagram illustrating an example computing environment with which some of the disclosed examples can be implemented.

FIG. 14 depicts a generalized example of a suitable computing environment 1400 in which the described innovations may be implemented. The computing environment 1400 is not intended to suggest any limitation as to scope of use or functionality, as the innovations may be implemented in diverse general-purpose or special-purpose computing systems. For example, the computing environment 1400 can be any of a variety of computing devices (e.g., desktop computer, laptop computer, server computer, tablet computer, media player, gaming system, mobile device, etc.)

With reference to FIG. 14, the computing environment 1000 includes one or more processing units 1410, 1415 and memory 1420, 1425. In FIG. 14, this basic configuration 1430 is included within a dashed line. The processing units 1410, 1415 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s). The memory 1420, 1425 stores software 1480 implementing one or more innovations described herein, in the form of computer-executable instructions suitable for execution by the processing unit(s). For example, analysis module 1306 and detector control module 1310 shown in FIG. 13 can be stored.

A computing system may have additional features. For example, the computing environment 1400 includes storage 1440, one or more input devices 1450, one or more output devices 1460, and one or more communication connections 1470. An interconnection mechanism (not shown) such as a bus, controller, or network interconnects the components of the computing environment 1400. Typically, operating system software (not shown) provides an operating environment for other software executing in the computing environment 1400, and coordinates activities of the components of the computing environment 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing environment 1400. The storage 1440 stores instructions for the software 1480 implementing one or more innovations described herein. For example, storage 1440 can include software for analysis module 1306 and detector control module 1310 shown in FIG. 13. Modules contain computer-executable instructions.

The input device(s) 1450 may be a touch input device such as a keyboard, mouse, pen, or trackball, a voice input device, a scanning device, or another device that provides input to the computing environment 1400. The output device(s) 1460 may be a display, printer, speaker, CD-writer, or another device that provides output from the computing environment 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

I claim:

1. A method of determining a location of a radioactive source, the method comprising:
scanning a volume with one or more directional radiation detectors, the respective directional radiation detectors comprising:
a radiation sensor capable of sensing slow neutrons;
a first radiation attenuator partially surrounding the radiation sensor, the first radiation attenuator defining a first aperture and composed at least in part of a first material selected to slow neutrons;
a second radiation attenuator positioned between the first radiation attenuator and the radiation sensor, the second radiation attenuator defining a second aperture at least partially overlapping the first aperture, the second radiation attenuator composed at least in part of a second material selected to absorb neutrons slowed by the first radiation attenuator, where the second material is different from the first material; and
a third radiation attenuator positioned between the second radiation attenuator and the radiation sensor, the third radiation attenuator composed at least in part of a third material selected to slow neutrons, the third radiation attenuator being further positioned such that incident radiation that passes through the first aperture of the first radiation attenuator and the second aperture of the second radiation attenuator passes through the third radiation attenuator prior to reaching the radiation sensor,
wherein the scanning comprises automatically moving the one or more radiation detectors to a plurality of predetermined positions, and for the respective positions, taking a reading of radiation magnitude;
receiving detector data from the one or more directional radiation detectors, the detector data obtained from the scanning of the volume,
wherein the detector data comprises, for each of the one or more directional radiation detectors, a plurality of readings of a radiation magnitude and a corresponding detector orientation; and
for each of the one or more directional radiation detectors:
determining, based on the received detector data, that a radiation magnitude represents radiation emitted by the radioactive source and received through the first and second apertures;
identifying the corresponding detector orientation; and
based on the detector orientation, calculating a solid angle within which the radioactive source is located.

2. The method of claim 1, wherein for given radiation emitted by the radioactive source, if the radiation is received through the first and second apertures, the radiation magnitude is higher than if the radiation were received through the first and second radiation attenuators of the detector.

3. The method of claim 1, wherein automatically moving the one or more radiation detectors to a plurality of predetermined positions comprises rotating through the plurality of predetermined positions over a time period.

4. The method of claim 1, wherein scanning the volume further comprises:
varying the size of the first or second aperture of the one or more directional radiation detectors and taking a reading of radiation magnitude for a plurality of detector aperture sizes.

5. The method of claim 1, wherein scanning the volume is a first scan performed while the one or more directional radiation detectors are at a first location, and further comprising:
performing a second scan of the volume while the one or more directional radiation detectors are at a second location; and
for each of the one or more directional radiation detectors:

determining, based on received detector data from the second scan, that a radiation magnitude represents radiation emitted by the radioactive source and received through the first and second apertures;

identifying the corresponding detector orientation; and based on the detector orientation, calculating a solid angle within which the radioactive source is located; and determining a location of the radioactive source based on the solid angles calculated using the detector data from the first and second scans.

6. The method of claim 1, wherein detector data is received for at least three directional radiation detectors, and the method further comprising:

determining a location of the radioactive source based on the solid angles calculated for the at least three directional radiation detectors.

7. The method of claim 6, wherein the determining comprises identifying an intersection of the solid angles calculated for the at least three directional radiation detectors.

8. A directional radiation detector, comprising:

a radiation sensor capable of sensing slow neutrons;

a first radiation attenuator partially surrounding the radiation sensor, the first radiation attenuator defining a first aperture, the first radiation attenuator composed at least in part of a first material, the first material selected to slow neutrons;

a second radiation attenuator positioned between the first radiation attenuator and the radiation sensor, the second radiation attenuator defining a second aperture at least partially overlapping the first aperture, the second radiation attenuator composed at least in part of a second material, the second material selected to absorb neutrons slowed by the first radiation attenuator, where the second material is different from the first material; and a third radiation attenuator positioned between the second radiation attenuator and the radiation sensor, the third radiation attenuator composed at least in part of a third material, the third material selected to slow neutrons, the third radiation attenuator being further positioned such that incident radiation that passes through the first aperture of the first radiation attenuator and the second aperture of the second radiation attenuator passes through the third radiation attenuator prior to reaching the radiation sensor, wherein the first and second radiation attenuators are shaped such that a source of the incident radiation can be located using a plurality of readings obtained at different detector orientations and corresponding different times.

9. The directional radiation detector of claim 8, wherein the first material is at least one of water or polyethylene, and wherein the second material is at least one of boron carbide or cadmium.

10. The directional radiation detector of claim 8, wherein the radiation sensor comprises a scintillator crystal, and further comprising:

an optical sensor that detects an optical output from the scintillator crystal and provides an electrical output signal proportional to the optical output.

11. The directional radiation detector of claim 8, wherein at least one of the first aperture or the second aperture is adjustable.

12. The directional radiation detector of claim 8, wherein a distance between the radiation sensor and at least one of the first aperture or the second aperture is adjustable.

13. The directional radiation detector of claim 8, wherein a solid angle defined by the first and second aperture is greater than or equal to $2\pi$ steradians.

14. The directional radiation detector of claim 8, wherein the radiation sensor comprises a gas-filled tube.

15. A system, comprising:

at least two radiation detectors, the respective radiation detectors comprising:

a radiation sensor capable of sensing slow neutrons;

a first radiation attenuator partially surrounding the radiation sensor, the first radiation attenuator defining a first aperture, the first radiation attenuator composed at least in part of a first material, the first material selected to slow neutrons;

a second radiation attenuator positioned between the first radiation attenuator and the radiation sensor, the second radiation attenuator defining a second aperture at least partially overlapping the first aperture, the second radiation attenuator composed at least in part of a second material, the second material selected to absorb neutrons slowed by the first radiation attenuator, where the second material is different from the first material; and a third radiation attenuator positioned between the second radiation attenuator and the radiation sensor, the third radiation attenuator composed at least in part of a third material, the third material selected to slow neutrons, the third radiation attenuator being further positioned such that incident radiation that passes through the first aperture of the first radiation attenuator and the second aperture of the second radiation attenuator passes through the third radiation attenuator prior to reaching the radiation sensor, wherein the first and second radiation attenuators are shaped such that a source of the incident radiation can be located using a plurality of readings obtained at different detector orientations and corresponding different times.

16. The system of claim 15, wherein the first material is at least one of water or polyethylene, and wherein the second material is at least one of boron carbide or cadmium.

17. The system of claim 15, wherein the radiation sensor comprises a scintillator crystal, the system further comprising an optical sensor configured to detect an optical output from the scintillator crystal and provide an electrical output signal proportional to the optical output.

18. The system of claim 15, wherein the radiation sensor comprises a gas-filled tube.

19. The system of claim 15, wherein at least one of i) at least one of the first aperture or the second aperture is adjustable or ii) a distance between the radiation sensor and at least one of the first aperture or the second aperture is adjustable.

20. The system of claim 15, wherein the system comprises at least three radiation detectors.

* * * * *